United States Patent [19]

Ando et al.

[11] 4,080,624
[45] Mar. 21, 1978

[54] OPTICAL COLOR-SEPARATION SYSTEM FOR USE IN A COLOR TELEVISION CAMERA

[75] Inventors: Kunio Ando; Toshiro Yamauchi; Seiji Toyama; Haruo Kakizawa, all of Omiya, Japan

[73] Assignee: Fuji Photo Optical Co., Ltd., Omiya, Japan

[21] Appl. No.: 760,723

[22] Filed: Jan. 19, 1977

[30] Foreign Application Priority Data

Jan. 30, 1976 Japan ............................... 51-9092

[51] Int. Cl.² .......................... H04N 3/16; H04N 9/09
[52] U.S. Cl. ........................................ 358/55; 358/223; 358/217
[58] Field of Search .................. 358/50, 52, 55, 217, 358/223, 225; 350/172, 173

[56] References Cited

U.S. PATENT DOCUMENTS

| 3,590,145 | 6/1971 | Schneider et al. | 358/223 |
| 4,031,551 | 6/1977 | Nobutoki et al. | 358/223 |

Primary Examiner—John C. Martin
Attorney, Agent, or Firm—Harold L. Stults

[57] ABSTRACT

An optical color-separation system for use in a color television camera having an image plane compensating lens associated with each of three camera tubes. Each compensating lens is provided with a diffusing area lying on the periphery thereof so as to be out of the image forming optical path. Photo-diodes are provided in opposing relation to the diffusing area. Light from the photo-diodes passes through the diffusion area to provide bias light for the camera tube.

4 Claims, 3 Drawing Figures

OPTICAL COLOR-SEPARATION SYSTEM FOR USE IN A COLOR TELEVISION CAMERA

BACKGROUND OF THE INVENTION

1. Field of the Invention

This invention relates to an optical color-separation system for use in a color television camera, and more particularly to such an optical color-separation system having means to project a beam of bias light to each of the camera tubes used in the color television camera.

2. Description of the Prior Art

FIG. 1 shows the basic structure of a relay type color-separation system for use in a color television camera. In the drawing the light rays from an object pass through a taking lens 110 and are focused on a field lens 120 to form an image. The light rays from the so-formed image are collimated by a first relay lens system 140, and the collimated light rays are separated into different color components by dichroic mirrors 151 and 152. Selected color component beams are directed along different paths by mirrors 153 and 154. Thus, three different color component beams are projected through second relay lens systems 161, 162 and 163 to three associated camera tubes and images of different color are formed in the camera tubes.

With a view to improving the "after image" effect of an image to be taken with a camera tube, it has been proposed to optically condition the camera tube by projecting thereon not only the light carrying the image information but also an additional illuminating light of given constant intensity. In practice, as shown in FIG. 1, a half mirror 131 is positioned between the field lens 120 and the first relay lens system 140, and a diffusing plate 132 is placed at a distance from the half mirror 131 equal to the distance from the half mirror 131 to the field lens 120. A beam of light from a light source 135 is projected onto the diffusing plate 132 so that a bias light is added to the beam of light carrying image information. Alternatively a half mirror is put in the first relay lens system 140 as a means for introducing a beam of bias light into the image forming optical path. However, the optical distances from the first relay lens system 140 to the second relay lens systems 161, 162 and 163 are not equal, and therefore different parabolic shadings inevitably result. With a view to reducing these parabolic shadings, a correction filter 133 is used to distribute the bias light on the diffusing plate 132 in a counter-parabolic shape to produce parabolic shadings opposite to those which would otherwise result. However, it is difficult to completely eliminate the parabolic shadings in this way because they differ somewhat in the red, green and blue channels. Also disadvantageously, different color shadings result from the different angles of light incidence on the dichroic mirrors 151 and 152, and these color shadings are also difficult to reduce. Thus, uniform illumination of all camera tubes with the bias light is practically impossible with the bias light introducing system mentioned above, and it is often necessary to use an electric circuit for the purpose of compensation. The conventional bias light introducing system uses a half mirror as indicated at 131, and disadvantageously a certain amount of light is lost both in the image-forming channel and the bias light introducing channel. Also disadvantageously, a color compensating filter is inevitably used to provide a proper amount of light to each of the optical channels and the color temperature of the electric bulb must be controlled at a given constant value.

SUMMARY OF THE INVENTION

In view of the above defects, the primary object of this invention is to provide an improved optical color-separation system for use in a color television camera in which system an even amount of bias light is projected on each of the camera tubes without any loss of light along the optical path. To attain this object, the optical color-separation system for use in a color television camera according to this invention includes three image surface compensating lenses and a light source to project a beam of bias light onto the photo-electric converting plane of each camera tube. Each image surface compensating lens has a diffusing surface lying on its periphery and is associated with one of the three camera tubes associated with the three different color components. The beam of bias light is projected through the diffusing area of the associated lens.

DETAILED DESCRIPTION OF THE EMBODIMENT

Figure 1:
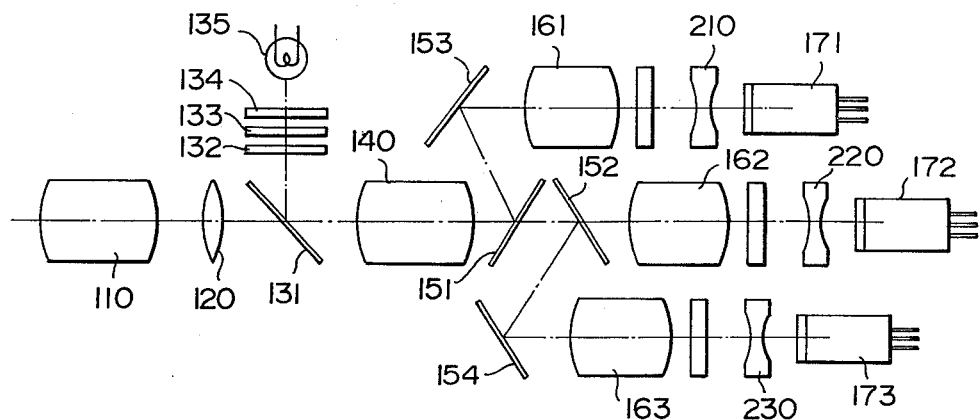
FIG. 1 shows the basic structure of a conventional relay type color-separation system for use in a television camera.
Figure 2:
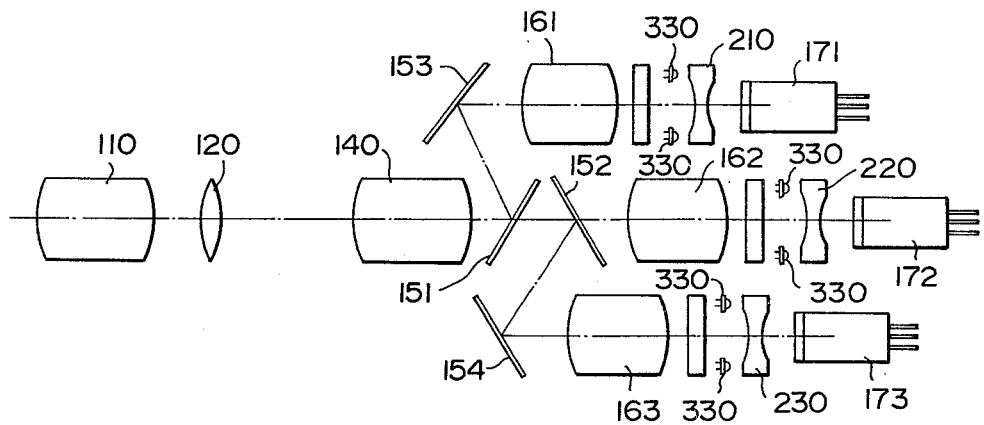
FIG. 2 shows an optical color-separation system for use in a color television camera according to this invention.

Referring to FIG. 2, there is shown an optical color-separation system for use in a color television camera according to this invention. Elements identical to those shown in FIG. 1 are indicated by the same reference numerals. The image forming light rays pass through the image surface compensating lenses 210, 220 and 230, but not through the annular area on the periphery of each image plane compensating lens. This annular area is ground flat and used as a diffusing area according to this invention. A plurality of illuminating means are put adjacent to the diffusing area of each image plane compensating lens, thus causing illuminating light to diffuse through the diffusing area of the lens. The divergent light rays from the diffusing area is evenly projected onto the photo-electric converting plane of the associated camera tube 171, 172 or 173. When the optical color-separation system is used in a color television camera, the taking lens 110, the first relay lens system 140 and the second relay lens systems 161, 162, 163 each constitutes a positive lens system. The field lens 120 also constitutes a positive lens system. Therefore, the Petzval sum of the whole system is so large that the image plane characteristics at the image forming plane are made poor. With a view to improving the image plane characteristics, a negative lens system comprising an image plane compensating lens is put in front of each camera tube. In the drawing, the negative lens systems associated with the camera tubes 171, 172 and 173 are shown to comprise the image plane compensating lenses 210, 220 and 230, respectively.

Figure 3:
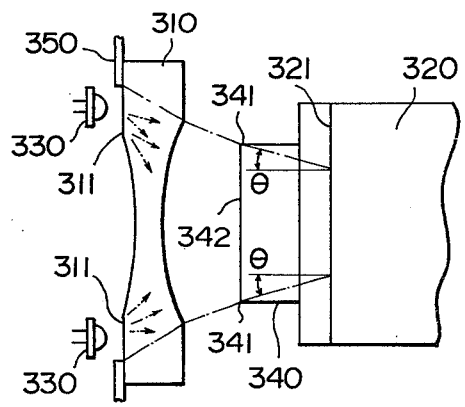
FIG. 3 shows the bias light introducing system used in the color-separation system of FIG. 1.

FIG. 3 shows the bias light inserting system according to this invention in greater detail. The lens 310 in FIG. 3 is similar to the image plane compensating lenses 210, 220 and 230 in FIG. 2, and the camera tube 320 is similar to those indicated by 171, 172 and 173 in FIG. 1.

Photo-diodes are indicated by 330. The image plane compensating lens 310 has a diffusing area 311 formed of ground glass or the like on the periphery thereof. The diffusing area 311 encircles the optical path of the image forming light rays. A plurality of photo-diodes 330 are provided in opposing relation to the diffusing area 311. The light rays from the photo-diodes are diffused through the diffusing area and the divergent light rays from the diffusing area are projected onto the photo-electric converting plane 321 of the camera tube 320. Thus, the photo-electric converting plane is evenly exposed to the light. If a flare reducing tip 340 is additionally provided in the camera tube, it is necessary to use a shield plate 350 or the like to prevent light rays having an angle of incidence larger than the maximum angle A with regard to the photo-electric converting plane 321 from falling onto the actual image forming area of the converting plane 321. An interference membrane 342 may be provided in front of the flare reducing tip 340 to shut out near infrared radiation. In this case, if photo-diodes emitting red light are used, a counter-parabolic shading will be formed and this will darken the center of the image forming plane. This is because the light rays fall onto the center area of the image forming plane at a larger angle of incidence than the light rays falling onto the peripheral area of image forming plane and accordingly the light rays falling onto the center area lose more light in passing through the thickness of the interference membrane. This problem can be eliminated by using photo-diodes emitting yellow or green light.

As is apparent from the above, the optical color-separation system for use in a color television camera according to this invention has numerous advantages: the bias light can be adjusted to the desired amount simply by controlling the electric current flowing in the photo-diodes; the fact that the dichroic mirrors produce no color shading and relay lenses do not produce vignetting assures that an equal amount of bias light is projected on each camera tube so that no extra compensating means is required; as the source of bias light there is used a part of the image surface compensating lens and since the image surface compensating lens is, by nature, positioned near the camera tube full use is made of the light; the bias light inserting system requires no extra optical elements such as half mirrors which would otherwise be necessary in the image forming optical path only for the purpose of inserting the bias light therein and, therefore, this invention can easily be applied to an existing relay type optical color-separation system without substantial modification of the system.

We claim:

1. In an optical color-separation system for use in a color television camera including an image plane compensating lens for each camera tube, the improvement wherein said image surface compensating lens is provided with a light diffusing area through which illuminating light is projected from a light source onto the photo-electric converting plane of said camera tube, thus providing a beam of bias light to said camera tube.

2. An optical color-separation system for use in a color television camera according to claim 1 wherein said diffusing area is an annular area at the periphery of said image plane compensating lens.

3. An optical color-separation system for use in a color television camera according to claim 1 wherein said light source is a plurality of photo-diodes provided in opposing relation to said diffusing area.

4. An optical color-separation system for use in a color television camera according to claim 3 wherein said photo-diodes are photo-diodes which emit yellow or green light.

* * * * *